(12) United States Patent
Hoff

(10) Patent No.: US 10,415,517 B2
(45) Date of Patent: Sep. 17, 2019

(54) EXHAUST SCAVENGING SYSTEM FOR AN ENGINE SYSTEM

(71) Applicant: Caterpillar Inc., Peoria, IL (US)

(72) Inventor: Brian D. Hoff, Washington, IL (US)

(73) Assignee: Caterpillar Inc., Deerfield, IL (US)

( * ) Notice: Subject to any disclaimer, the term of this patent is extended or adjusted under 35 U.S.C. 154(b) by 108 days.

(21) Appl. No.: 15/852,308

(22) Filed: Dec. 22, 2017

(65) Prior Publication Data

US 2019/0195179 A1 Jun. 27, 2019

(51) Int. Cl.
  *F02M 35/00* (2006.01)
  *F02M 35/09* (2006.01)
  *F02M 35/08* (2006.01)
  *B01D 46/00* (2006.01)
  *B60K 11/08* (2006.01)

(52) U.S. Cl.
  CPC ......... *F02M 35/09* (2013.01); *B01D 46/0042* (2013.01); *B60K 11/08* (2013.01); *F02M 35/086* (2013.01); *B01D 2279/60* (2013.01)

(58) Field of Classification Search
  CPC ...... F02M 35/09; F02M 35/086; F02M 35/08; F02M 35/04; B01D 46/0042; B01D 2279/60; B60K 2279/60
  See application file for complete search history.

(56) References Cited

U.S. PATENT DOCUMENTS

| 3,137,553 | A | 6/1964 | Billey |
| 3,866,580 | A | 2/1975 | Whitehurst et al. |
| 9,616,373 | B2 | 4/2017 | Kinsey, Jr. et al. |
| 2014/0102483 | A1* | 4/2014 | Hong ............... F02M 35/086 134/21 |
| 2014/0196682 | A1* | 7/2014 | Sheidler ............ F02F 7/0021 123/195 R |
| 2015/0145355 | A1* | 5/2015 | Kincaid ............ H02K 5/136 310/54 |

FOREIGN PATENT DOCUMENTS

FR  2356533  9/1981

\* cited by examiner

*Primary Examiner* — Thomas N Moulis
(74) *Attorney, Agent, or Firm* — Jeff A. Greene

(57) ABSTRACT

The present disclosure relates to an exhaust scavenging system for an engine system including an engine enclosed in an engine enclosure and an air intake system including an air filter having a filter element for filtering air. The exhaust scavenging system includes an exhaust conduit, a venturi, and a valve system. The exhaust conduit is coupled to the engine and is configured to receive exhaust gas discharged by the engine. The venturi is associated with the exhaust conduit and operates to generate a suction to draw air from the air filter and the engine enclosure. The valve system is configured to selectively fluidly connect the venturi with the engine enclosure or the air filter. The valve system fluidly connects the venturi with the air filter for facilitating purging of the filter element of the air filter.

20 Claims, 1 Drawing Sheet

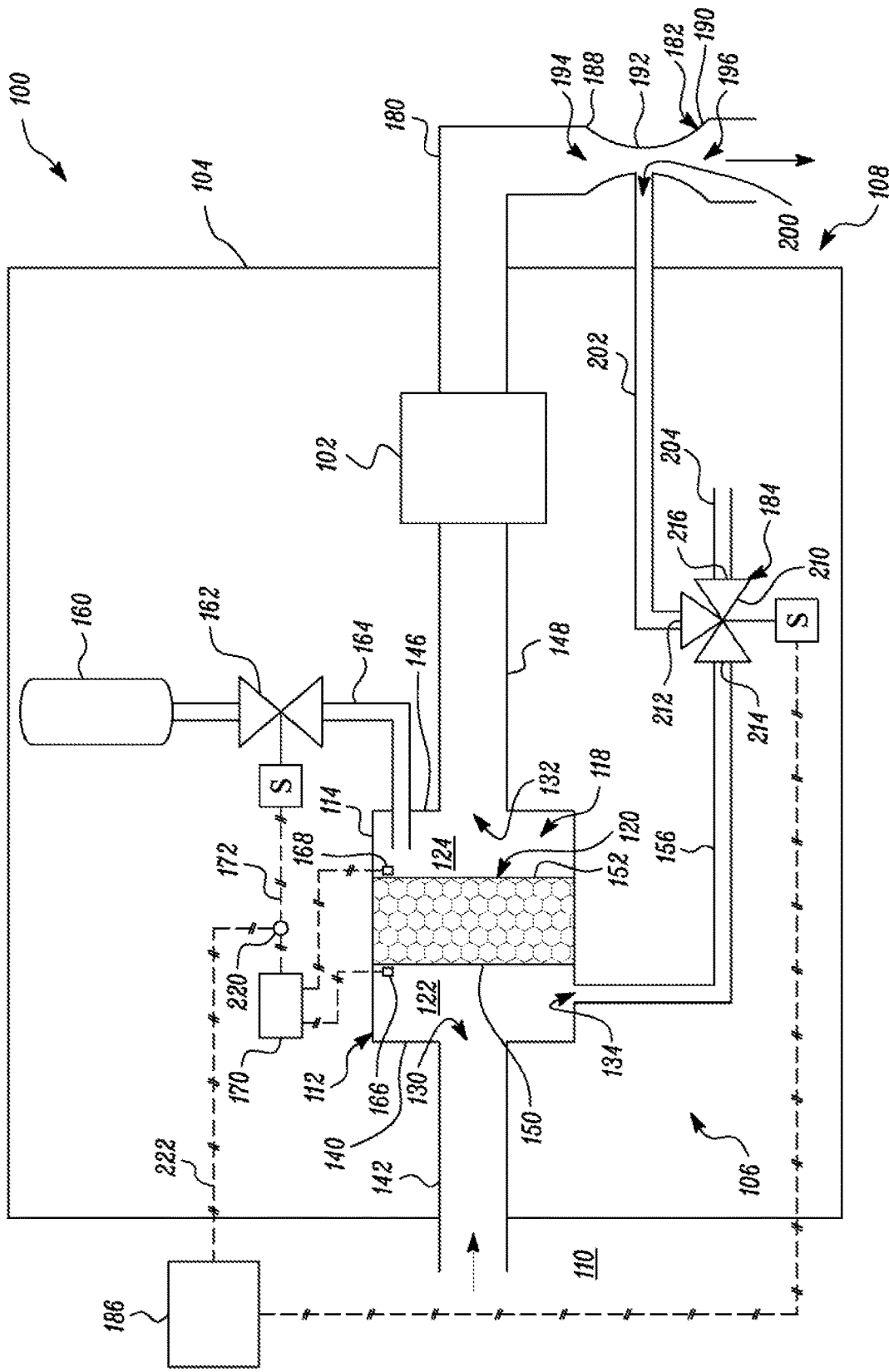

EXHAUST SCAVENGING SYSTEM FOR AN ENGINE SYSTEM

TECHNICAL FIELD

The present disclosure generally relates to an engine system and, more particularly, relates to an exhaust scavenging system for the engine system.

BACKGROUND

Internal combustion engine of an engine system is generally supplied with air for combustion. The air entering the internal combustion engine may carry contaminants along with it. To prevent possible contamination and damage to engine system components by contaminants ingested from the environment, air filters are provided to filter the air supplied for combustion. Owing to the operational conditions, the air filters may become clogged with contaminants over a period, and thus may need to be purged. A typical purging operation includes passing air against a direction of flow of the air entering the internal combustion engine to dislodge the contaminants from the air filters and move the contaminants out to the environment. Typically, a blower is used to facilitate a flow of the purged contaminants along with the air from the air filters to the environment by generating a suction. However, the blower adds to an extra cost, mass, and power consumption.

SUMMARY

In an aspect of the present disclosure, an exhaust scavenging system for an engine system is provided. The engine system includes an engine enclosed inside an engine enclosure and an air intake system including an air filter having a filter element for filtering air. The exhaust scavenging system includes an exhaust conduit, a venturi, and a valve system. The exhaust conduit is coupled to the engine and is configured to receive exhaust gas discharged by the engine. The venturi is associated with the exhaust conduit and is operated to generate a suction to draw air from the air filter and the engine enclosure. The valve system is configured to selectively fluidly connect the venturi with the engine enclosure or the air filter, wherein the valve system fluidly connects the venturi with the air filter for facilitating purging of the filter element of the air filter.

In another aspect of the present disclosure, an engine system is disclosed. The engine system includes an engine enclosure and an engine enclosed inside the engine enclosure. The engine system further includes an air intake system having an air filter including a filter element for filtering air. The engine system also includes an exhaust conduit, a venturi, and a valve system. The exhaust conduit is coupled to the engine and is configured to receive exhaust gas discharged by the engine. The venturi is associated with the exhaust conduit and operates to generate a suction to draw air from the air filter and the engine enclosure. The valve system is configured to selectively configured to fluidly connect the venturi with the engine enclosure or the air filter. The valve system fluidly connects the venturi with the air filter for facilitating purging of the filter element of the air filter.

In a yet another aspect of the present disclosure, a method for operating an engine system is disclosed. The engine system includes an engine enclosed inside an engine enclosure, an exhaust conduit coupled to the engine to receive exhaust gas discharged by the engine, and an air filter having a filter element to filter air being provided to the engine. The method includes generating a suction by a venturi associated with the exhaust conduit to draw air from the air filter and the engine enclosure. The suction is generated due to passage of exhaust gas through the venturi. The method further includes controlling a three-way valve to selectively control flow of air from the air filter or the engine enclosure to the venturi due to the suction generated by the venturi. The three-way valve is moved to a first position to enable the flow of air from the air filter to the venturi for facilitating a purging of the filter element. Further, the three-way valve is moved to a second position to enable the flow of air from the engine enclosure to the venturi for facilitating an inlet of air into the engine enclosure.

BRIEF DESCRIPTION OF DRAWINGS

FIG. 1 is a schematic illustration of an engine system depicting an exhaust scavenging system, in accordance with an embodiment of the present disclosure.

DETAILED DESCRIPTION

FIG. 1 illustrates an exemplary engine system 100. The engine system 100 may be associated with a mobile machine or a stationary machine. The mobile machine may include, for example, an earth moving machine, a construction machine, a mining machine, an agricultural machine, a military machine, etc. The stationary machine may include, for example, a generator set. The engine system 100 includes an engine 102 housed within an engine enclosure 104, an air intake system 106, and an exhaust scavenging system 108. The engine enclosure 104 is configured to protect the engine 102 and various other associated components and systems from external debris.

The engine 102 may be an internal combustion engine, and is configured to receive air-fuel mixture into one or more combustion chambers (not shown) within the engine 102 for combustion and subsequent power generation. In an embodiment, the engine 102 may be a gasoline engine, a diesel engine, a gaseous engine, a dual fuel engine, a turbine engine, or any other such engine. In some other implementations, the engine 102 may be a 2-stroke engine or a 4-stroke engine. The engine 102 may be single cylinder engine or a multi cylinder engine. It may be appreciated that the scope of the present disclosure is not limited by use of any particular type of engine.

The engine 102 is fluidly coupled with the air intake system 106 to receive air from an ambient 110 to enable combustion of a fuel and production of power. The air intake system 106 may include an air filter 112 having a filter enclosure 114 defining a chamber 118, and a filter element 120 disposed inside the chamber 118. The filter element 120 divides the chamber 118 into a first chamber 122 and a second chamber 124. The filter enclosure 114 further includes an inlet port 130, an outlet port 132, and a purge port 134. The inlet port 130 is disposed at a first chamber side 140 of the filter enclosure 114, and is configured to allow an inlet of air into the first chamber 122 of the filter enclosure 114. The air intake system 106 may also include an inlet conduit 142 coupled with the inlet port 130 (i.e. the air filter 112) to facilitate a flow of air to the first chamber 122 via the inlet port 130 from the ambient 110. In an embodiment, the air filter 112 may be positioned within the engine enclosure 104, and in such a case, a portion of the inlet conduit 142 may extend outside the engine enclosure 104 (as shown in FIG. 1). The outlet port 132 is disposed at a second chamber side 146 of the filter enclosure 114, and is configured to allow an exit of air from the second chamber 124 of the air filter 112 to the engine 102. An outlet conduit 148 may connect the outlet port 132 to an intake manifold of the engine 102, thereby facilitating a flow of air from the air filter 112 to the engine 102.

The filter element 120 disposed inside the chamber 118 may include a first surface 150 facing the first chamber 122, and a second surface 152 facing the second chamber 124. The filter element 120 is configured to filter air flowing from the first chamber 122 to the second chamber 124 through the filter element 120. In doing so, various dust or debris present in air may be trapped on the first surface 150. The filter element 120 may a pleated filter element, a corrugated filter element, or any such filter element known in the art. The purge port 134 of the air filter 112 may be defined or disposed at the first chamber side 140 of the filter enclosure 114. A purge conduit 156 may extend from the purge port 134, and may facilitate a flow of air out of the first chamber 122 to the exhaust scavenging system 108 during a purging of the air filter 112.

The air intake system 106 may further include an air reservoir 160, a control valve 162, and a supply conduit 164. The air reservoir 160 may be configured to store air at a pressure, and may be in selective fluid communication with the air filter 112. As illustrated, the air reservoir 160 may provide compressed air to the air filter 112 though the supply conduit 164. In an embodiment, the supply conduit 164 fluidly couples the air reservoir 160 with the second chamber 124 of the filter enclosure 114 (i.e. the air filter 112). The control valve 162 is configured to control/regulate an amount and flow of compressed air from the air reservoir 160 to the second chamber 124 of the air filter 112. In certain implementations, the control valve 162 is a solenoid actuated valve, and opening and closing of the control valve 162, and a degree of opening of the control valve 162 may be controlled electrically for facilitating the purging of the filter element 120 of the air filter 112. The purging of air filter 112 is defined as removing debris or contaminants from the filter element 120. Although, the air reservoir 160 is contemplated, it may be appreciated that the compressed air for facilitating the purging of the air filter 112 may be provided by any other suitable air source, such as a compressor, an accumulator, etc.

The air filter 112 may further include one or more sensors, for example a first sensor 166 and a second sensor 168 to determine a clogging of the filter element 120 (i.e. the air filter 112). The first sensor 166 may be disposed into the first chamber 122, while the second sensor 168 may be disposed into the second chamber 124. The first sensor 166 and the second sensor 168, each may be configured to monitor one or more parameters associated with a clogging of the filter element 120. In an embodiment, the first sensor 166 may measure a first pressure (P1) of air inside the first chamber 122, and the second sensor 168 may measure a second pressure (P2) of air inside the second chamber 124. A level of the clogging of the air filter 112 may be determined based on a pressure differential (i.e. difference in the first pressure and the second pressure (P1-P2)) across the filter element 120. The first sensor 166 and the second sensor 168 may be in communication with an air filter controller 170 of the air intake system 106, and may transmit data related to the first pressure (P1) and the second pressure (P2) to the air filter controller 170. The air filter controller 170 may also be in communication with the control valve 162, and may control the opening and closing of the control valve 162 to initiate and facilitate the purging of the filter element 120 of the air filter 112 based on determination of the level of clogging of the filter element 120. In an embodiment, the air filter controller 170 may initiate the purging of the air filter 112 when the level of the clogging of the filter element 120 is above a first clogging threshold. The air filter controller 170 is configured to open the control valve 162 to enable a flow of compressed air from the air reservoir 160 to the air filter 112 for initiating and facilitating the purging of the air filter 112 (i.e. the filter element 120). The air filter controller 170 is configured to keep the control valve 162 open till the level of clogging of the filter element 120 falls below a second clogging threshold.

Additionally, or optionally, the air filter controller 170 may initiate the purging based on a predetermined operational pattern or a predetermined state of the engine 102. As an example, the air filter controller 170 may initiate the purging of the filter element 120 (i.e. the air filter 112) after predetermined duration of operation of the engine 102. In another example, the air filter controller 170 may initiate the purging every time the engine 102 is started. The purging may also be performed when an engine speed may fall below a speed threshold. For example, the purging may be performed during a low engine speed state or an engine idle state.

The air filter controller 170 may control a supply of voltage signals to the control valve 162 for an opening and a closing of the control valve 162. The voltage signals may be transmitted through a communication line 172 as shown. As an example, when the control valve 162 needs to be opened, the air filter controller 170 may supply a voltage signal that is above a first voltage threshold value to the control valve 162. In response to the voltage signal that is above the first voltage threshold value, the control valve 162 may be opened to allow flow of compressed air from the air reservoir 160 to the second chamber 124. Conversely, when the control valve 162 needs to be closed, the air filter controller 170 may halt a voltage signal transfer altogether or may deliver a voltage signal that is below a second voltage threshold value to the control valve 162. In response to the voltage signal that is below the second voltage threshold value, the control valve 162 may be closed to block flow of compressed air from the air reservoir 160 to the second chamber 124.

The exhaust scavenging system 108 is configured to facilitate the purging of the filter element 120 of air filter 112, and also facilitates an inlet of air inside the engine enclosure 104 from the ambient 110. The exhaust scavenging system 108 facilitates the inlet of air inside the engine enclosure 104 from the ambient 110 by facilitating an outlet of air from the engine enclosure 104, and thereby creating a suction inside the engine enclosure 104. The exhaust scavenging system 108 includes an exhaust conduit 180, a venturi 182 and a valve system 184, and a controller 186. The exhaust conduit 180 is coupled to the engine 102, and may be configured to receive exhaust gas discharged by the engine 102. The exhaust conduit 180 facilitates a flow of exhaust gas discharged by the engine 102 to the ambient 110.

The venturi 182 is fluidly connected to the exhaust conduit 180 and the valve system 184. The venturi 182 may include a first axial end 188 and a second axial end 190, and a venturi throat 192 formed between the first axial end 188 and the second axial end 190. The venturi 182 may define the smallest cross-sectional area at the venturi throat 192. In an embodiment, the cross-sectional area of the venturi 182 decreases from the first axial end 188 to the venturi throat 192, and thereafter increases from the venturi throat 192 to the second axial end 190 along a length of the venturi 182.

The first axial end 188 maybe be coupled to the exhaust conduit 180, and may define an inlet 194 to receive at least a portion of the exhaust gas from the exhaust conduit 180, while the second axial end 190 may define an outlet 196 to discharge exhaust gas from the venturi 182. As the cross-sectional area of the venturi 182 at the venturi throat 192 is smaller than the cross-sectional area of venturi 182 at the inlet 194, the venturi 182 is configured to generate a relatively low pressure i.e., suction at the venturi throat 192 due to the change in velocity of exhaust gas from inlet 194 of the venturi 182 to the venturi throat 192.

The venturi 182 may further include a scavenging port 200 formed at the venturi throat 192, and a feed line 202 may connect the scavenging port 200 and the valve system 184. Although, the venturi 182 is contemplated as a separate component, it may be appreciated that the venturi 182 may be formed as an integral part of the exhaust conduit 180. In an alternate embodiment, the exhaust conduit 180 may include a muffler (not shown), and the venturi 182 may be associated with the muffler. For example, the venturi 182 may be formed as an integral part of the muffler, or may be coupled to the muffler as a separate component. The valve system 184 is configured to selectively fluidly connect the scavenging port 200 i.e., the venturi 182 with the engine enclosure 104 or the air filter 112 (the purge port 134). The venturi 182 is fluidly connected to the engine enclosure 104 to facilitate a cooling of the engine 102 (described later), while the venturi 182 is fluidly connected to the air filter 112 to facilitate the purging of the filter element 120 of the air filter 112. The valve system 184 is fluidly connected with the purge port 134 (air filter 112) via the purge conduit 156. Further, a suction conduit 204 may fluidly connect the engine enclosure 104 with the valve system 184. In such a case, an inlet of the suction conduit 204 may be disposed inside the engine enclosure 104.

The valve system 184 may include one or more valves, for example a three-way valve 210 having a first port 212 coupled to the scavenging port 200 of the venturi 182 through the feed line 202, a second port 214 coupled to the purge port 134 through the purge conduit 156, and a third port 216 in fluid communication with an inside of the engine enclosure 104 through the suction conduit 204. It may be appreciated that the three-way valve 210 may be positioned inside the engine enclosure 104, and in such a case, the suction conduit 204 may be omitted. The three-way valve 210 may be configured to move to a first position and a second position to selectively fluidly connect the venturi 182 with the air filter 112 or the engine enclosure 104.

In the first position of the three-way valve 210, the first port 212 is fluidly connected with the second port 214, while the third port 216 is fluidly disconnected from the second port 214 and the first port 212. Therefore, in the first position, the three-way valve 210 allows a flow of air from the first port 212 to the second port 214, thereby allowing a flow of air from the air filter 112 to the venturi 182. Thus, in the first position of the three-way valve 210, the air filter 112 is fluidly connected to the venturi 182, while the fluid connection of the engine enclosure 104 with the venturi 182 is disabled. In the second position of the three-way valve 210, the first port 212 is fluidly connected with the third port 216, while the second port 214 is fluidly disconnected from both the first port 212 and the third port 216. Therefore, in the second position, the three-way valve 210 allows a flow of air from the third port 216 to the first port 212, thereby allowing a flow of air from the engine enclosure 104 to the venturi 182. Thus, in the second position of the three-way valve 210, the engine enclosure 104 is fluidly connected to the venturi 182, while the fluid connection of the air filter 112 with the venturi 182 is disabled. Although, a single three-way valve is contemplated, the valve system 184 may include two valves, each individually controlling a fluid connection of the air filter 112 and the engine enclosure 104 with the venturi 182. Moreover, in some implementations, the valve system 184 may include a four-way valve that may be switched to the positions discussed for the three-way valve 210, but may be altered to a third position in which fluid connections of the venturi 182 with both the engine enclosure 104 and the air filter 112 is disabled.

In an embodiment, the three-way valve 210 may be a solenoid actuated valve, and the controller 186 may send a signal to the three-way valve 210 to move the three-way valve 210 between the first position and the second position. In an embodiment, the controller 186 may move the three-way valve 210 to the first position to fluidly connect the venturi 182 with the air filter 112 when an initiation of the purging of the filter element 120 is determined. In certain implementations, the controller 186 may move the three-way valve 210 to the first position to fluidly connect the venturi 182 with the air filter 112 when the clogging of the filter element 120 (air filter 112) is above the first clogging threshold to facilitate the purging of the filter element 120 (i.e. the air filter 112).

In an embodiment, the controller 186 may be communicably coupled to the communication line 172 extending between the air filter controller 170 and the control valve 162. The controller 186 is configured to detect the voltage signals receivable by the control valve 162, and determine the initiation of the purging of the air filter 112 when a voltage signal receivable by the control valve 162 is detected above the first voltage threshold value. The controller 186 is also configured to determine the completion of the purging of the air filter 112 when a voltage signal receivable by the control valve 162 falls below the second voltage threshold value, for a predefined time duration, t1. In one example, the controller 186 may include a communication line 222 that may be spliced to the communication line 172 extending between the air filter controller 170 and the control valve 162. In that manner, a supply of voltage, passed from the air filter controller 170 to the control valve 162, may be gathered by the controller 186 to determine the initiating and/or completion of a purging of the filter element 120 i.e., the air filter 112.

In one example, the air intake system 106 may include a sensor 220, such as a voltage sensor, arranged on the communication line 172, and which may detect the voltage signal passing through the communication line 172. The controller 186 may be coupled to the sensor 220 via the communication line 222 to receive data pertaining to the voltage signal to determine the initiation and/or completion of a purging of the filter element 120 i.e., the air filter 112.

Based on the determination of the initiation of the purging of the air filter 112 i.e., the filter element 120, the controller 186 is further configured to fluidly connect the venturi 182 with the air filter 112 by moving the three-way valve 210 to the first position. Also, based on the determination of the completion of the purging of the air filter 112 (i.e. when the voltage signal receivable by the control valve 162 falls below the second voltage threshold value, for the predefined time duration, t1), the controller 186 is configured to fluidly connect the venturi 182 with the engine enclosure 104 by moving the three-way valve 210 to the second position. In this manner, the controller 186 is configured to enable the inlet of air inside the engine enclosure 104 from the ambient 110 when the purging of the filter element 120 i.e., the air filter 112 is not performed. The inlet of air inside the engine enclosure 104 happens due to an outlet of the air from the engine enclosure 104 to the venturi 182 via the feed line 202 due to the suction generated at the venturi throat 192 caused by flow of exhaust gases through the venturi 182.

In an embodiment, each cycle of the purging of the air filter 112 may include one or more purging events. More particularly, the controller 186 may detect the voltage signal falling below the second voltage threshold value subsequent to the detection of voltage signal exceeding the first voltage threshold value, and co-relate said sequential detection to a single voltage pulse, and thus to a single purging event of the air filter 112. The controller 186 may detect multiple such purging events in succession to the single purging event, each within regular time intervals, and such multiple purging events may correspond to one purging cycle of the air filter 112. In such a case, the controller 186 may detect the completion of the purging when the controller 186 continues to detect a value of the voltage signals receivable by the control valve 162 below the second voltage threshold value for a predetermined time period. It may be appreciated that the predetermined time period is greater than a time duration between successive purge events of single purging cycle.

In one embodiment, the air filter controller 170 may be omitted, and functions of the air filter controller 170 may be performed by the controller 186. Accordingly, it is possible for the controller 186 to determine a clogging of the air filter 112 when the pressure difference between the first chamber 122 and the second chamber 124 exceeds a first pressure differential threshold. The first pressure differential threshold may indicate the clogging of the filter element 120 i.e., the air filter 112 is above the first clogging threshold. In such a case, the controller 186 may open the control valve 162 to enable flow of compressed air from the air reservoir 160 to the second chamber 124 i.e., the air filter 112 to facilitate the purging of the filter element 120. Also, the controller 186 may move the valve system 184 (move the three-way valve 210 to the first position) to fluidly connect the first chamber 122 (the air filter 112) to the venturi 182.

Further, the controller 186 may close the control valve 162 and move the valve system 184 to disable the fluid connection of the venturi 182 with the air filter 112 when the clogging of the air filter 112 reaches below the second clogging threshold. The second clogging threshold may correspond to the second pressure differential threshold between the first chamber 122 and the second chamber 124. It may be appreciated that the second pressure differential threshold is less than the first pressure differential threshold. The controller 186 may move the three-way valve 210 to the second position to fluidly disconnect the air filter 112 from the venturi 182. Thus, the controller 186 fluidly connects the venturi 182 with the engine enclosure 104 upon completion of the purging of the air filter 112 (i.e., the filter element 120).

INDUSTRIAL APPLICABILITY

During operation, air for combustion from the ambient 110 may be drawn into the engine 102 for combustion. This air may first pass into the inlet conduit 142, enter the air filter 112 through the inlet port 130. As air may be further pulled into the engine 102, air passes through the filter element 120 and is filtered of the contaminants or debris. Filtered air is then further passed down to the one or more combustion chambers within the engine 102. Filtered air inside the combustion chambers of the engine 102 facilitates a combustion of the fuel, thereby generating power and exhaust gas.

According to an exemplary method for operating the engine system 100, the exhaust gas generated by the engine 102 is discharged to the ambient 110 via the exhaust conduit 180 and the venturi 182. As the exhaust gas passes through the venturi 182, a suction is generated at the venturi throat 192 due to increased velocity of the exhaust gas caused by relatively smaller cross-section area of the venturi 182 at the venturi throat 192. The suction inside the venturi 182 is generated to draw air from the engine enclosure 104 and the air filter 112. Initially, in the absence of the purging of the air filter 112, the controller 186 may move the three-way valve 210 to the second position, thereby fluidly connecting the venturi 182 to the engine enclosure 104. As a result, the air present inside the engine enclosure 104 may flow to the venturi 182 via the feed line 202 due to the suction generated inside the venturi 182. Due to outflow of air from the engine enclosure 104 to the venturi 182, air from ambient 110 enters inside the engine enclosure 104 which facilitates a cooling of the engine 102 and other components disposed inside the engine enclosure 104. The air may enter inside the engine enclosure 104 from the ambient 110 through various cracks or openings of the engine enclosure 104.

Further, during the passage of air through the filter element 120, the first surface 150 of the filter element 120 traps the contaminants or debris therein. Over a period, as more and more air is pulled into the engine 102, a degree of contaminants or debris trapped at the first surface 150 may increase. This increase in contaminants may eventually breach the first clogging threshold, thereby indicating the requirement to purge the filter element 120 i.e., the air filter 112.

In response to the breach in the first clogging threshold, the air filter controller 170 may pass a voltage signal (which is above the first voltage threshold value) to the control valve 162 to open the control valve 162, thus causing compressed air from the air reservoir 160 to pass towards the second surface 152 of the filter element 120. At least a portion of this compressed air moves through the filter element 120, from the second surface 152 to the first surface 150, and in transit through the filter element 120, dislodges the contaminants trapped at the first surface 150 of the filter element 120 and moves the contaminant to the first chamber 122.

The controller 186 may detect the voltage signal, passed by the air filter controller 170, to be above the first clogging threshold, and accordingly, may determine the initiation of the purging of the air filter 112. Based on said determination, the controller 186 may move the three-way valve 210 to the first position, and thereby may fluidly connect the venturi 182 with the first chamber 122 of the air filter 112. As a result, the air present inside the first chamber 122 may be drawn to the venturi 182 via the purge conduit 156 and the feed line 202 due to the suction generated inside the venturi 182. This in turn facilitates the purged contaminants (dislodged from the first surface 150) to flow along with the air drawn from the first chamber 122 to the venturi 182, and then be released to the ambient 110.

As gradually the contaminants from the first surface 150 are purged and dislodged, the clogging of the air filter 112 may fall below the second clogging threshold. At this point, the air filter controller 170 may determine that a further purging of the air filter 112 may be unrequired and/or may be stopped. Accordingly, the air filter controller 170 may halt a transmission of a voltage signal or transmits a voltage signal that is below the second voltage threshold value to the control valve 162 to close the control valve 162. As a result, flow of compressed air to the second chamber 124 from the air reservoir 160, and hence the air filter 112 is stopped.

The controller 186 may detect this voltage signal (i.e. below the second voltage threshold value) for the predetermined time duration and accordingly, may determine the completion of the purging of the air filter 112. In an embodiment, the controller 186 may fluidly disconnect the venturi 182 with the air filter 112 either at the completion of the purging of the air filter 112, or after a predefined time has lapsed since the determination of said completion. The controller 186 may fluidly disconnect the air filter 112 from the venturi 182 by moving the three-way valve 210 to the second position. In so doing, the controller 186 fluidly connects the engine enclosure 104 with the venturi 182, thereby enabling the inlet of air inside the engine enclosure 104 from the ambient 110 to facilitate cooling of the engine 102 as described previously.

In an embodiment, when the air filter controller 170 is omitted, the controller 186 may be directly linked with the first sensor 166 and the second sensor 168, and may directly seek input from the first sensor 166 and the second sensor 168 of respective pressure conditions within the first chamber 122 and the second chamber 124. Such input may help the controller 186 determine a pressure differential across the filter element 120. Accordingly, as soon as the controller 186 may detect an increase of the pressure differential above the first pressure differential threshold, the controller 186 may determine that the clogging of the filter element 120 has reached above the first clogging threshold. In response, the controller 186 may transmit a voltage signal that is above the first voltage threshold value to the control valve 162 for opening the control valve 162, and may also move the three-way valve 210 to the first position to facilitate the purging of the filter element 120. Further, the controller 186 may close the control valve 162 and move the three-way valve 210 to the second position when a pressure differential across the filter element 120 falls below the second pressure differential threshold. In this manner, the exhaust scavenging system 108 of the present disclosure enables the purging of the filter element 120 (the air filter 112) as well as improved cooling of the engine 102 without additional consumption of power.

It will be apparent to those skilled in the art that various modifications and variations can be made to the system of the present disclosure without departing from the scope of the disclosure. Other embodiments will be apparent to those skilled in the art from consideration of the specification and practice of the system disclosed herein. It is intended that the specification and examples be considered as exemplary only, with a true scope of the disclosure being indicated by the following claims and their equivalent.

What is claimed is:

1. An exhaust scavenging system for an engine system having an engine enclosed inside an engine enclosure and an air intake system including an air filter having a filter element for filtering air, the exhaust scavenging system comprising:
   an exhaust conduit coupled to the engine and configured to receive exhaust gas discharged by the engine;
   a venturi associated with the exhaust conduit and operating to generate a suction to draw air from the air filter and the engine enclosure; and
   a valve system configured to selectively fluidly connect the venturi with the engine enclosure or the air filter, wherein the valve system fluidly connects the venturi with the air filter for facilitating purging of the filter element of the air filter.

2. The exhaust scavenging system of claim 1, wherein the valve system includes a three-way valve configured to move to a first position and a second position, wherein in the first position, the three-way valve fluidly connects the venturi with the air filter and in the second position, the three-way valve fluidly connects the venturi with the engine enclosure for facilitating inlet of air inside the engine enclosure.

3. The exhaust scavenging system of claim 2, further including a controller in communication with the three-way valve and the air intake system, the controller configured to
   determine an initiation of the purging of the filter element, and
   move the three-way valve to the first position to fluidly connect the venturi with the air filter when the initiation of the purging of the filter element is determined.

4. The exhaust scavenging system of claim 3, wherein the air intake system further including
   an air reservoir configured to store air at a pressure and configured to provide air from the air reservoir to the air filter for facilitating the purging of the filter element, and
   a control valve configured to control flow of air from the air reservoir to the air filter, wherein
      the controller is configured to determine the initiation of the purging of the filter element by detecting a voltage signal receivable by the control valve associated with an opening of the control valve, wherein the opening of the control valve permits the flow of air from the air reservoir to the air filter.

5. The exhaust scavenging system of claim 2, further including a controller in communication with the three-way valve and the air intake system, the controller configured to
   determine a clogging of the filter element, and
   move the three-way valve to the first position to fluidly connect the venturi with the air filter when the clogging of the filter element is above a first clogging threshold.

6. The exhaust scavenging system of claim 5, wherein the clogging of the filter element is determined by detecting a pressure differential across the filter element.

7. The exhaust scavenging system of claim 2, wherein the three-way valve is a solenoid actuated valve.

8. An engine system, comprising:
   an engine enclosure;
   an engine enclosed inside the engine enclosure;
   an air intake system including an air filter having a filter element for filtering air;
   an exhaust conduit coupled to the engine and configured to receive exhaust gas discharged by the engine;
   a venturi associated with the exhaust conduit and operating to generate a suction to draw air from the air filter and the engine enclosure; and
   a valve system configured to selectively fluidly connect the venturi with the engine enclosure or the air filter, wherein the valve system fluidly connects the venturi with the air filter for facilitating purging of the filter element of the air filter.

9. The engine system of claim 8, wherein the valve system includes a three-way valve configured to move to a first position and a second position, wherein in the first position, the three-way valve fluidly connects the venturi with the air filter and in the second position, the three-way valve fluidly connects the venturi with the engine enclosure for facilitating inlet of air inside the engine enclosure.

10. The engine system of claim 9, further including a controller in communication with the three-way valve and the air intake system, the controller configured to
 determine an initiation of the purging of the filter element, and
 move the three-way valve to the first position to fluidly connect the venturi with the air filter when the initiation of the purging of the filter element is determined.

11. The engine system of claim 10, wherein the air intake system further including
 an air reservoir configured to store air at a pressure and configured to provide air from the air reservoir to the air filter for facilitating the purging of the filter element, and
 a control valve configured to control flow of air from the air reservoir to the air filter, wherein
  the controller is configured to determine the initiation of the purging of the filter element by detecting a voltage signal receivable by the control valve associated with an opening of the control valve, wherein the opening of the control valve permits the flow of air from the air reservoir to the air filter.

12. The engine system of claim 9, further including a controller in communication with the three-way valve and the air intake system, the controller configured to
 determine a clogging of the filter element, and
 move the three-way valve to the first position to fluidly connect the venturi with the air filter when the clogging of the filter element is above a first clogging threshold.

13. The engine system of claim 11, wherein the clogging of the filter element is determined by detecting a pressure differential across the filter element.

14. The engine system of claim 9, wherein the three-way valve is a solenoid actuated valve.

15. A method for operating an engine system, the engine system including an engine enclosed inside an engine enclosure, an exhaust conduit coupled to the engine to receive exhaust gas discharged by the engine, and an air filter having a filter element to filter air being provided to the engine, the method comprising:
 generating a suction by a venturi associated with the exhaust conduit to draw air from the air filter and the engine enclosure, wherein the suction is generated due to passage of exhaust gas through the venturi; and
 controlling a three-way valve to selectively control flow of air from the air filter or the engine enclosure to the venturi due to the suction generated by the venturi, wherein
  the three-way valve is moved to a first position to enable the flow of air from the air filter to the venturi for facilitating a purging of the filter element, and
  the three-way valve is moved to a second position to enable the flow of air from the engine enclosure to the venturi for facilitating an inlet of air into the engine enclosure.

16. The method of claim 15, further comprising
 determining, by a controller, an initiation of the purging of the filter element, and
 moving the three-way valve to the first position to fluidly connect the venturi with the air filter when the initiation of the purging of the filter element is determined.

17. The method of claim 16, further including
 storing air, by an air reservoir, at a pressure and providing air from the air reservoir to the air filter for facilitating the purging of the filter element, and
 controlling flow of air from the air reservoir to the air filter, wherein
  the initiation of the purging of the filter element is determined by detecting a voltage signal receivable by a control valve associated with an opening of the control valve, wherein the opening of the control valve permits the flow of air from the air reservoir to the air filter.

18. The method of claim 15, further comprising
 determining, by a controller, a clogging of the filter element, and
 moving the three-way valve, by the controller, to the first position to fluidly connect the venturi with the air filter when the clogging of the filter element is above a first clogging threshold.

19. The method of claim 18, further including
 determining the clogging of the filter element by detecting a pressure differential across the filter element.

20. The method of claim 15, wherein the three-way valve is a solenoid actuated valve.

* * * * *